United States Patent [19]

Tsugawa

[11] Patent Number: 4,719,948
[45] Date of Patent: Jan. 19, 1988

[54] METHOD OF AND APPARATUS FOR WINDING COILS

[75] Inventor: Takayuki Tsugawa, Kaisei, Japan

[73] Assignee: Odawara Engineering Company Limited, Kaisei, Japan

[21] Appl. No.: 872,678

[22] Filed: Jun. 10, 1986

[30] Foreign Application Priority Data

Jun. 14, 1985 [JP] Japan .................................. 60-128098

[51] Int. Cl.⁴ .............................................. B21F 3/00
[52] U.S. Cl. .................................................. 140/92.1
[58] Field of Search ........................................ 140/92.1

[56] References Cited

U.S. PATENT DOCUMENTS

3,765,080 10/1973 Lauer ................................... 140/92.1
4,470,436 9/1984 Kubota et al. ...................... 140/92.1

*Primary Examiner*—Lowell A. Larson
*Attorney, Agent, or Firm*—Ladas & Parry

[57] ABSTRACT

In an apparatus for winding coils for a stator of an electric motor, a guide plate with a plurality of guide steps is disposed movably along a coil former member and is lowered more quickly than the coil former member so that one of the guide steps is located at the border between two adjacent steps of the coil former member. The leading wire can be smoothly led by each guide step without decreasing a winding speed when a winding operation is transferred from a step of the coil former member to an upper step thereof.

8 Claims, 17 Drawing Figures

METHOD OF AND APPARATUS FOR WINDING COILS

BACKGROUND OF THE INVENTION

This invention relates to a method of and an apparatus for winding coils such as stator coils of electric motor and more specifically to a method and an apparatus in which wires are wound on a coil former having a plurality of steps with increasingly larger size diameters, and in which the formed coils are dropped into a coil-inserting tool below the coil former.

As a kind of conventional method of and an apparatus for winding coils, there are examples of apparatuses which are disclosed in Japanese Patent Publication No. 18417/1982 and International Publication No. WO 82/02290.

In the above conventional apparatus, a coil former is composed of two divided coil formers each of which has a plurality of steps with increasingly larger size diameters and the divided coil former members are fixed to a support member capable of sliding up and down.

Around the coil former are provided four stripper rods which are capable of sliding up and down, respectively. A stripper plate is mounted radially at the forward end of each stripper rod. When each stripper plate is moved longitudinally downward in a gap formed in the coil former, the stripper plate transfers the formed coils on the coil former therefrom to the coil-inserting tool.

Outside the coil former is disposed a winding flyer which supports and guides a wire. When the winding flyer rotates around the coil former, a wire is wound on each step of the coil former.

Under the coil former is disposed a coil-inserting tool comprisiong a plurality of elongate angularly spaced apart blades of generally circular cross-section forming a cage. The coil-inserting tool receives the formed coils from the coil former and enables the formed coils to insert into a stator of an electric motor. When the coil former moves downward, the lowermost (first) step of the coil former enters slightly into the forward portion of the coil-inserting tool. In this state, upon the winding flyer beginning to rotate, a wire is wound on a first step of the coil former. During this operation, the stripper rods move up and down to push down each turn from the first step of the coil former toward the blades of the coil-inserting tool. The coil-turns pushed by the stripper rods go into gaps between the blades of the coil-inserting tool.

At a final stage of coil-winding on the first step, most of coil turns are inserted in the coil-inserting tool with a part of the coil-turns left on the first step of the coil former.

After a predetermined number of turns are wound upon the lowermost step of the coil former, the coil former moves downward by a length of the step of the coil former so that the second step of the coil former is located in a winding position where coil-winding on the second step is carried out. At this time, a leading portion of the final turn of the coil-winding on the first step is led onto the second step of the coil former. Thus, a winding operation on the second step is started and then most part of these coil turns are also inserted into the coilinserting tool with a small part of the turns left on the second step thereof.

In a similar operation, the coil turns on a third step and then coil turns on a fourth step and coil turns on the remaining steps are formed.

When a winding operation for a final step has been completed, the stripper rods are moved downward for a relatively long distance to their respective lowermost positions and parts of coils left on the respective steps of the coil former are inserted entirely into the coil-inserting tool. In this manner, a winding operation for a first pole of a stator is completed. Then, the leading end of the coils for the first pole is clamped by a clamping device and the coil-inserting tool is indexed at a predetermined angle in response to the number of poles to carry out the next pole winding operation. Thereafter, the coils for the next pole is formed in the above manner. The above operations are repeated to obtain the coils for a desired number of poles of the stator. After the completion of all winding operations necessary for one stator of a motor, a cutting device is actuated to cut the wire.

However, in this conventional method and apparatus, when the winding operation of a lower step of the coil former has been completed and then is transferred from the lower step to the next upper step, the transferred portion of the wire is caught in a step-like portion defined between the upper and the lower steps and is apt to slip on the step-like portion. This results in a drawback that a wire cannot be reliably transferred to a next step of the coil former at a given position without failure.

In view of the above described circumstances, in the prior art, when a winding operation is transferred from a lower step of the coil former to a next upper step of the coil former, the rotative speed of the winding flyer is decreased from 2,000~3,000 r.p.m. to 300~500 r.p.m. Instead, some technical experts tried to design the coil former so that its configuration can prevent catching of the wire at a border of two adjacent steps.

However, in these conventional apparatuses, it is impossible to secure a smooth transfer of the wire at a border of two adjacent steps, and the efficiency of winding operation is much decreased because the rotative speed of the winding flyer must be decreased when the winding operation is transferred.

SUMMARY OF THE INVENTION

It is an object of this invention to provide a method and an apparatus in which a smooth transfer of a wire to be wound can be secured at a border of two adjacent steps of a coil former thereby to increase the efficiency of winding operations.

According to one aspect of the invention there is provided a method of winding coils for an electric motor in which a coil former having a plurality of winding steps with increasingly larger size moves downward step by step, a wire fed from a winding flyer rotated around the coil former is wound on each step of the coil former and coils wound on each step of the coil former are inserted into a coil-inserting tool having a plurality of blades in a circle and disposed below the coil former, said method comprising the steps of: (a) moving downward the coil former in order to set a lower winding step of the coil former at a winding position; (b) winding a predetermined number of turns on the lower winding step of the coil former while rotating the winding flyer around the coil former, some turns being dropped into the coil-inserting tool; (c) moving downward the coil former in order to set an upper winding step of the coil former on which a winding operation is to be carried out at a winding position with at least one step located lower than the upper winding step, inserted into the coil-inserting tool, simultaneously moving downward a guide member having at least one guide step each corresponding to each step of the coil former at a higher speed than the coil former and by a larger distance than the same thereby to locate a guide step of the guide member in a position where the guide step is projected downward from the border between the upper winding step and a step adjoining downwardly of the upper winding step when a winding operation is transferred from the lower winding step of the coil former to the upper step of the coil former; (d) winding a predetermined number of turns on the upper winding step of the coil former while rotating the winding flyer around the coil former with some turns being dropped into the coil-inserting tool; (e) repeating the motions of the coil former, the guide member and the flyer in the same manner as the above two steps (c), (d) in response to the number of winding steps of the coil former; and (f) inserting all turns on the steps of the coil former into the coil-inserting tool by moving down stripper means disposed so as to be moved vertically in the coil former.

According to another aspect of the invention, there is provided an apparatus for winding coils for an electric motor in which a coil former having a plurality of winding steps with increasingly larger size moves downward step by step, a wire fed from a winding flyer rotated around the coil former is wound on each winding step of the coil former, and the coils formed on each step are inserted into a coil-inserting tool having a plurality of blades in a circle and disposed below the coil former, said apparatus comprising: (a) driving means for moving downward the coil former in the vertical direction step by step; (b) a guide member disposed in the coil former and having a plurality of guide steps for guiding a leading wire from a low winding step to an upper winding step when a winding operation is transferred from the low winding step to the upper winding step, one of the guide steps being so formed as to be projected from a corresponding border between the upper winding step on which a winding operation is to be carried out and a step adjoining downwardly of the upper winding step; and (c) actuating means for moving downward the guide at a higher speed than the coil former and by a larger distance than the same when a winding operation is transferred from a step of the coil former to an upper step of the coil former in order to project one of the guiding steps outward from the corresponding border between the upper winding step and a step adjoining downwardly thereof.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIGS. 6(a), (b), (c) are views to explain the mode of operation of a cam and an actuating lever of the apparatus shown in FIG. 1, respectively;

FIGS. 7(a), (b), (c) are views to explain the mode of operation of a guide plate corresponding to FIGS. 6(a), (b), (c), respectively;

DETAILED DESCRIPTION OF THE INVENTION

Figure 1:
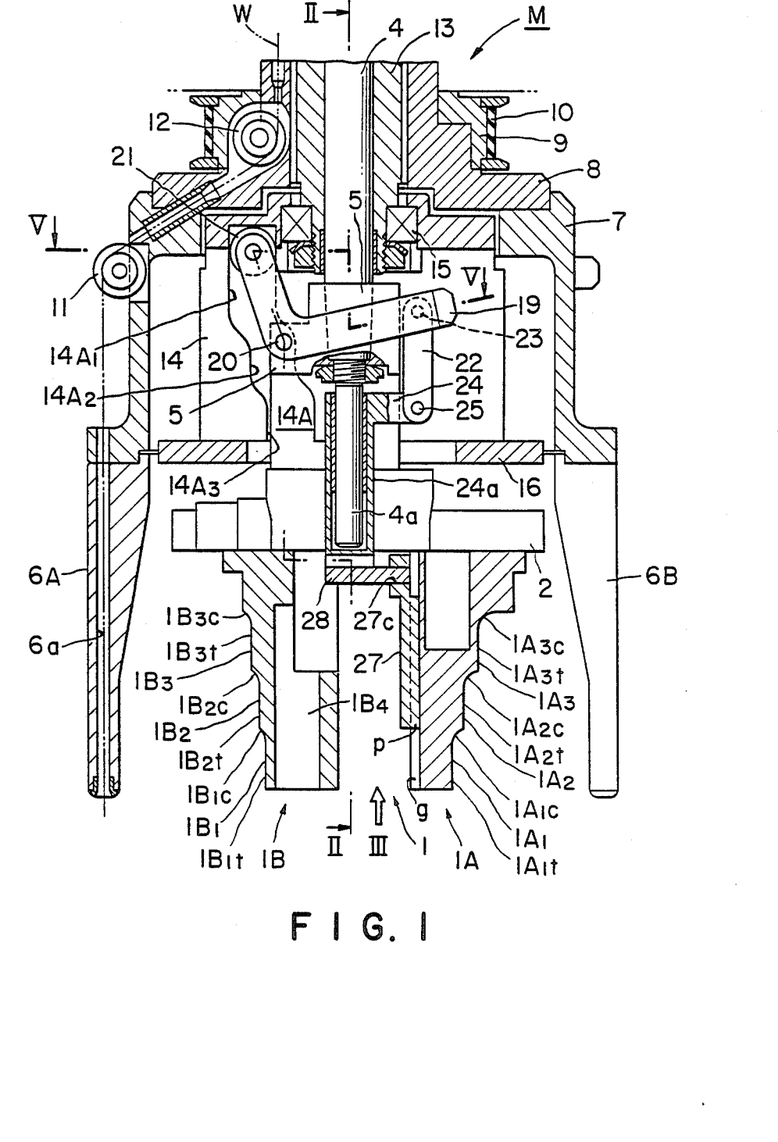
FIG. 1 is a side cross-sectional view of a preferred embodiment of an apparatus for winding coils in accordance with the present invention.
Figure 2:
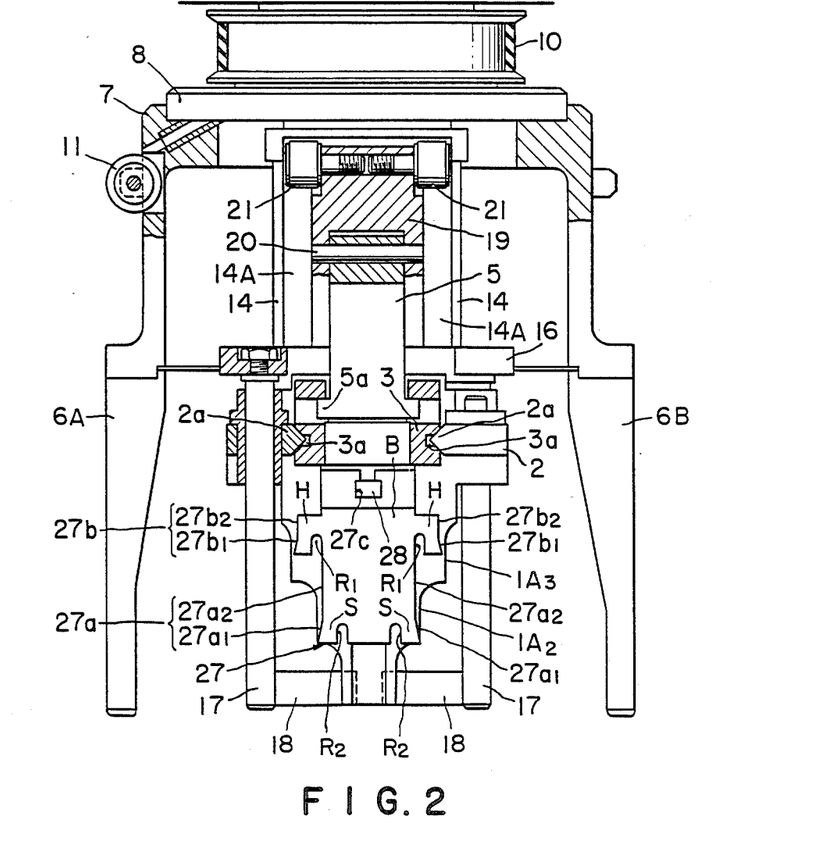
FIG. 2 is a sectional view taken along the line II—II in FIG. 1.

Referring first to FIG. 1, an apparatus M for winding coils has a coil former 1 at its lower portion. The coil former 1 is composed of two divided frames, one of which is a fixed coil former member 1B secured to a support member 2, the other of which is a movable coil former member 1A capable of moving relative to the support frame 2 to adjust the distance between the two coil former members 1A and 1B. As shown in FIG. 2, the support frame 2 suports a support plate 3 from which the two coil former members 1A and 1B are suspended. The support frame 2 has, at its inside, two guide rails 2a, 2a, while a support portion of the support plate 3 for supporting the movable coil former member 1A has, at its opposite sides, two engaging grooves 3a, 3a corresponding to the two guide rails 2a, 2a. The distance between the two members 1A, 1B can be adjusted by sliding the support portion for supporting the coil former member 1A relative to the coil former member 1B fixed on the support frame 2.

The movable coil former member 1A and the fixed coil former member 1B have, respectively, a plurality of first, second and third winding steps $1A_1$, $1A_2$, $1A_3$; $1B_1$, $1B_2$, $1B_3$ with increasingly large size dimensions as shown in FIG. 1. The steps $1A_1$, $1A_2$, $1A_3$; $1B_1$, $1B_2$, $1B_3$ of the coil former members 1A and 1B have slightly inwardly tapered outer surfaces $1A_{1t}$, $1A_{2t}$, $1A_{3t}$; $1B_{1t}$, $1B_{2t}$, $1B_{3t}$, respectively. The upper ends of the steps have circular curved surfaces $1A_{1c}$, $1A_{2c}$, $1A_{3c}$; $1B_{1c}$, $1B_{2c}$, $1B_{3c}$, respectively. The fixed coil former member 1B has a large-width opening $1B_4$ formed vertically in the longitudinal section into which a coil-inserting tool is inserted.

The support plate 3 is connected to a driving shaft 4 capable of sliding vertically through a connecting member 5, that is, the support plate 3 is connected to the lower projected portion 5a of the connecting member 5 and the driving shaft 4 is connected to the upper portion of the connecting member 5. The driving shaft 4 is moved up and down by a reciprocating mechanism (not shown) such as an air cylinder.

Outside the coil former 1 are disposed opposite to each other a winding flyer 6A and a balancer 6B and the flyer 6A supports and guides a magnetic wire W. The winding flyer 6A and the balancer 6B are mounted on a rotating housing 7 which is connected to a rotating member 8 with a pulley 9. The rotating member 8 is rotated by a timing belt 10 whereby the winding flyer 6A is rotated in a generally circular path about the coil former 1. The winding flyer 6A has a through bore 6a for passing and guiding a magnetic wire W.

The rotating housing 7 and the rotating member 8 have two pulleys 11 and 12 for guiding the wire W, respectively. The wire W to be supported by the winding flyer 6A is fed from a wire feeding device (not shown) onto the coil former 1 through the pulleys 11, 12. When the winding flyer 6A rotates around the coil former 1, a wire W is wound on each step of the coil former member 1 in order to form coils.

Figures 3, 5:
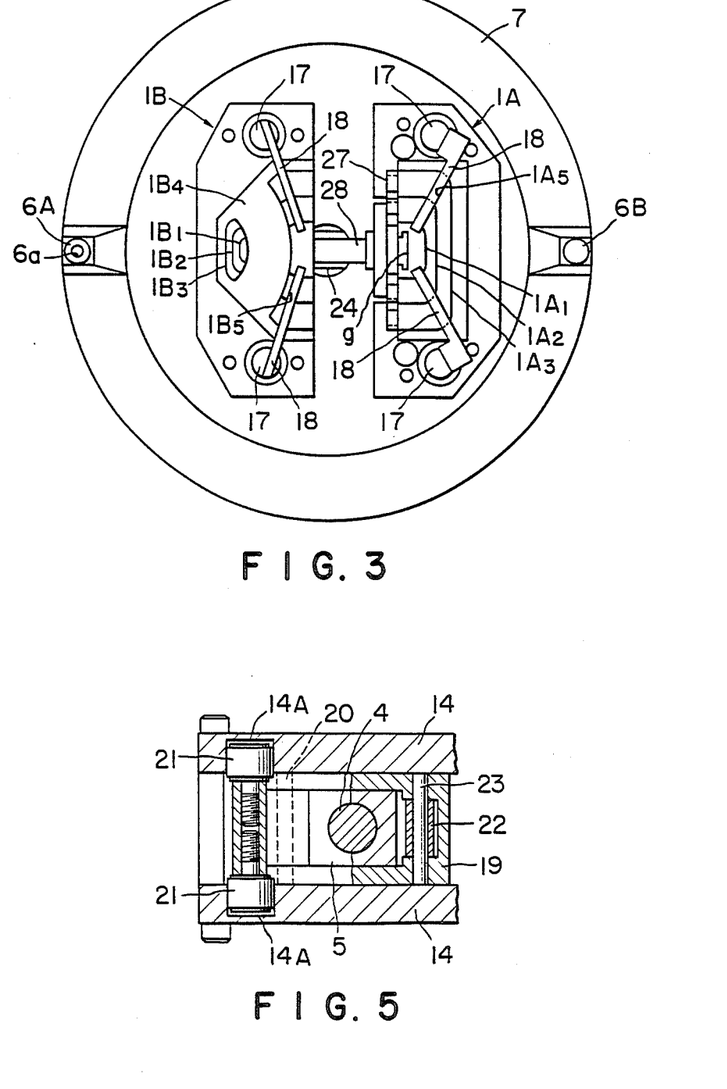
FIG. 3 is a bottom end view in the direction of the arrow III of FIG. 1.
FIG. 5 is a sectional view taken along the line V—V in FIG. 1.
Figure 4:
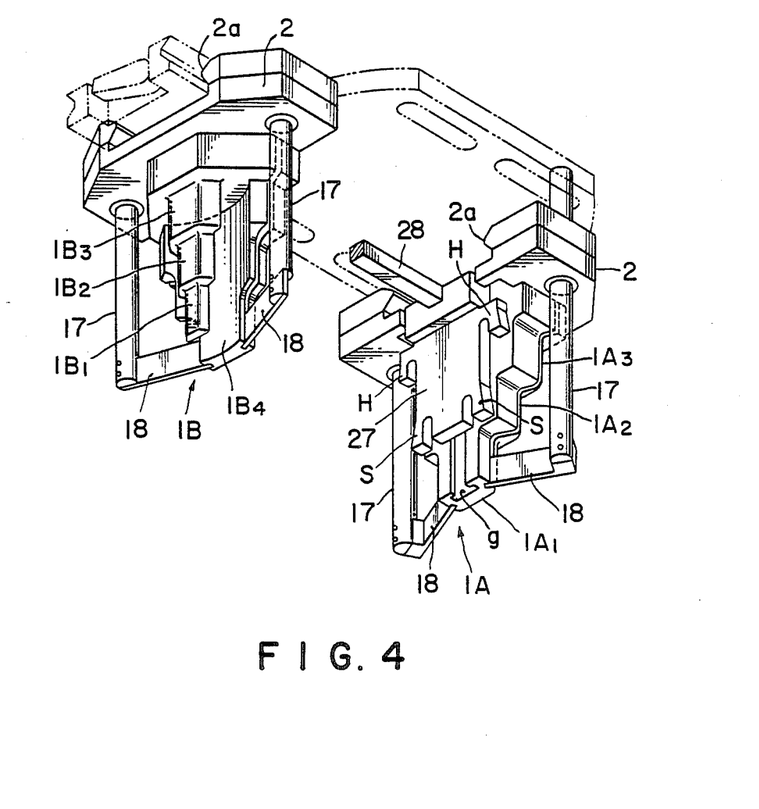
FIG. 4 is a perspective view, on enlarged scale, of the preferred embodiment as shown in FIG. 1.

Outside the driving shaft 4 is disposed a cylindrical spline shaft 13 which is rotatable and slidable relative to the driving shaft 4. The spline shaft 13 is coupled to the rotating member 8 in a spline-engagement relationship. That is, the rotation of the rotating member 8 causes that of the spline shaft 13 and the spline shaft 13 is slidable in its axial direction in the rotating member 8. The spline shaft 13 is moved up and down by an air cylinder (not shown) for a relatively large stroke. In this embodiment the spline shaft 13 is provided for moving down the coil former 1 when some coil turns left on each step of the coil former 1 are inserted together into a coil-inserting tool after a winding operation for a pole of a stator is completed. For this purpose, a simple cylindrical shaft may be used. The spline shaft 13 is connected to two guide plates 14 disposed opposite to each other outside the connecting member 5 through a bearing 15 as shown in FIG. 3. The two guide plates 14 are erected on a base plate 16 which has four stripper rods 17 outside the coil former 1, each of which supports a stripper plate 18 extending radially inwardly at its forward end. When the spline shaft 13 is moved up and down, the four stripper plates 18 are moved up and down in four slit-like gaps $1A_5$, $1A_5$; $1B_5$, $1B_5$ formed vertically in each coil former member 1A and 1B as shown in FIG. 3. Each gap is so formed as to extend inward of the coil former 1 from the four corners of the coil former members 1A and 1B as viewed in FIG. 3. The formed coils on each step of the coil former 1 are gradually transferred downwardly therefrom toward a coil-inserting tool along each outer surface tapered inwardly of the coil former 1.

As shown in FIGS. 1 and 3, an L-shaped actuating lever 19 is connected to the connecting member 5 through a pivot pin 20. As shown in FIGS. 1 and 5, two cam followers 21, 21 in the shape of a roller are provided on the both sides of one end of the actuating lever 19 while a vertical link 22 is connected to the other end thereof through a pivot pin 23. Furthermore, the lower end of the link 22 is connected to an actuating link 24 through a pivot pin 25, which has a cylindrical portion 24a accommodating slidably a small diameter portion 4a of the driving shaft 4.

As shown in FIGS. 1 and 3, each guide plate 14 has a step-like continuous cam profile 14A comprising first, second and third cam profiles $14A_1$, $14A_2$ and $14A_3$ whereby when the driving shaft 4 is lowered to cause the cam follower 21 to make into an engagement with the second and third cam profiles $14A_2$ and $14A_3$, the actuating lever 19 is swung in the clockwise direction as viewed in FIG. 1 about the pivot pin 20. At this time, the actuating link 24 having the cylindrical portion 24a is lowered through the link 22. The lower end of the actuating link 24 is connected to a guide plate 27 through a connecting piece 28. The guide plate 27 guides a wound wire and secures a smooth transfer of the wire at each border between the adjacent steps of the coil former 1. The guide plate 27 is in slidable contact with the inside surface of the movable coil former member 1A and is arranged to slide therealong vertically through engaging means such as engaging grooves g and guide rails p. As shown in FIG. 2, the guide plate 27 has a half-sleeve-shirt shape. On each side of the upper end of the guide plate 27 are provided two shoulder portions H, H projecting outward from a body portion B thereof while on each side of the lower end thereof are provided two skirt portions S, S. The shoulder portions H comprise an upper guide step $27b$ while the skirt portions S comprise a lower guide step $27a$. Inside each step $27a$, $27b$ are provided a pair of recesses $R_1$, $R_1$; $R_2$, $R_2$ for receiving wire turns formed on each winding step of the coil former members 1A and 1B. The distance between the lower recesses $R_1$, $R_1$ is almost equal to the width of the first step $1A_1$ to register the recesses $R_1$ with the first step $1A_1$ when the guide plate 27 is lowered while the distance between the upper recesses $R_2$, $R_2$ is almost equal to the width of the second step $1A_2$.

The upper guide step $27b$ has two tapered portions $27b_1$, $27b_1$ while the lower guide step $27a$ has two tapered portions $27a_1$, $27a_1$. The tapered portions $27a_1$, $27a_1$; $27b_1$, $27b_1$ are disposed symmetrically with respect to the axis of the guide plate 27. The two tapered portions $27b_1$, $27b_1$ are so formed as to expand downwardly while the two tapered portions $27a_1$, $27a_1$ are formed in the same manner. The two tapered portions $27a_1$, $27a_1$ are respectively connected to the two straight portions $27a_2$, $27a_2$ parallel to each other in the body portion B while the two tapered portions $27b_1$, $27b_1$ are respectively connected to the two straight portions $27b_2$, $27b_2$. The guide plate 27 has a slot $27c$, at its upper portion, in which the connecting piece 28 is engaged. The width between the lowermost ends of the respective tapered portions $27a_1$, $27a_1$; $27b_1$, $27b_1$ is nearly equal to the width between both sides of the corresponding steps $1A_2$, $1A_3$, respectively.

Figure 6:
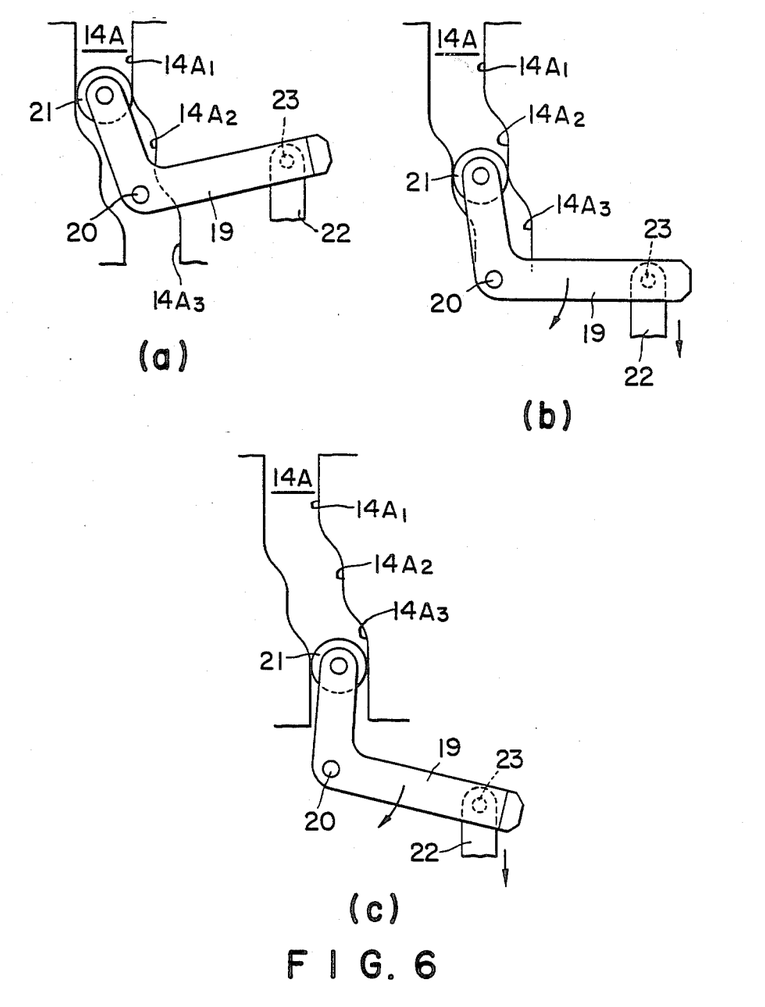

When the driving shaft 4 in a state shown in FIG. 1 is moved downward to lower the coil former 1 for a short distance, the cam followers 21, 21 attached to the actuating lever 19 are slid down along the first cam profiles $14A_1$. This state is shown in FIG. 6(a). At this time, the guide plate 27 is moved down together with the coil former 1 without a relative move between the guide plate 27 and the coil former 1 as shown in FIG. 7(a). That is, the downward movement of the driving shaft 4 simply causes the coil former 1 to move downward via the support frame 2. At this time, the lower step $27a$ is located inside the lower end of the second winding step $1A_2$ while the upper step $27b$ is located inside the first winding step $1A_3$. However, after the coil former 1 is further lowered by a distance corresponding to the height of each cam profile, the cam followers 21, 21 are engaged with the second cam profiles $14A_2$, respectively. At this time, the actuating lever 19 is swung in the clockwise direction as shown in FIG. 7(b), and the lower guide step $27a$ of the guide plate 27 is protruded downward from the lower end of the second winding step $1A_2$ of the movable coil former member 1A so as to cover the border between the first and second steps $1A_1$ and $1A_2$ with the guide step $27a$ as shown in FIG. 7(b). At this time, the upper guide step $27b$ is still located inside the third winding step $1A_3$ irrespective of its downward movement. Likewise, when the driving shaft 4 is further moved downward so that the cam followers 21, 21 are engaged with the third cam profiles $14A_3$ as shown in FIG. 6(c), the upper guide step $27b$ of the guide plate 27 is protruded from the lower end of the third winding step $1A_3$ of the movable coil former member 1A so as to cover the border between the second and third steps $1A_2$ and $1A_3$ with the upper guide step 27b as shown in FIG. 7(c). At this time, the lower step 27a is located outside the first winding step $1A_1$. The sizes and the shapes of the respective members such as the guide plate 27, the actuating link 24, the cam profile 14A and so on are determined so that the operation described above can be performed.

Next, the mode of operation of the apparatus M for winding coils with the above-described construction will be described.

Figure 8:
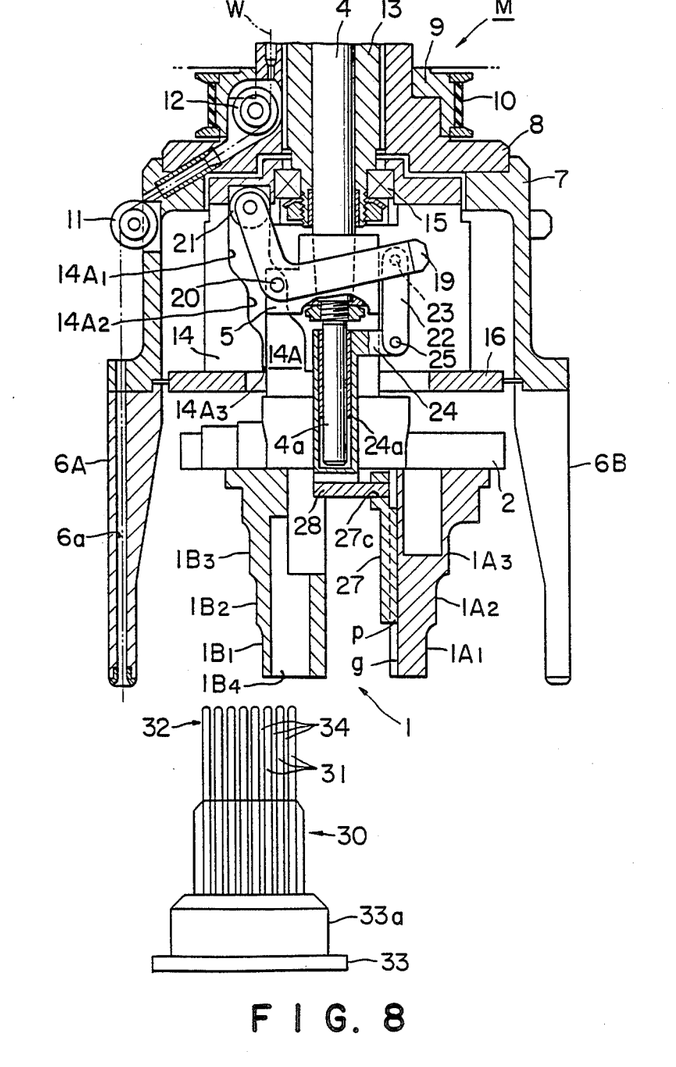
FIG. 8 shows the relationship between an apparatus for winding coils in FIG. 1 and a coil-inserting tool.

Referring to FIG. 8, a coil-inserting tool 30 for inserting the formed coils on each winding step into a stator of an electric motor is disposed under the coil former member 1. The coil-inserting tool 30 comprises a plurality of elongate angularly spaced apart blades 31 of generally circular cross-section forming a cage 32. The blades 31 of the cage 32 are mounted on a base 33 having a cylindrical portion 33a and extend outwardly therefrom so as to define a generally cylindrical outer periphery. The blades 31 are equally spaced thereby forming a plurality of elongate slots 34.

Figure 9:
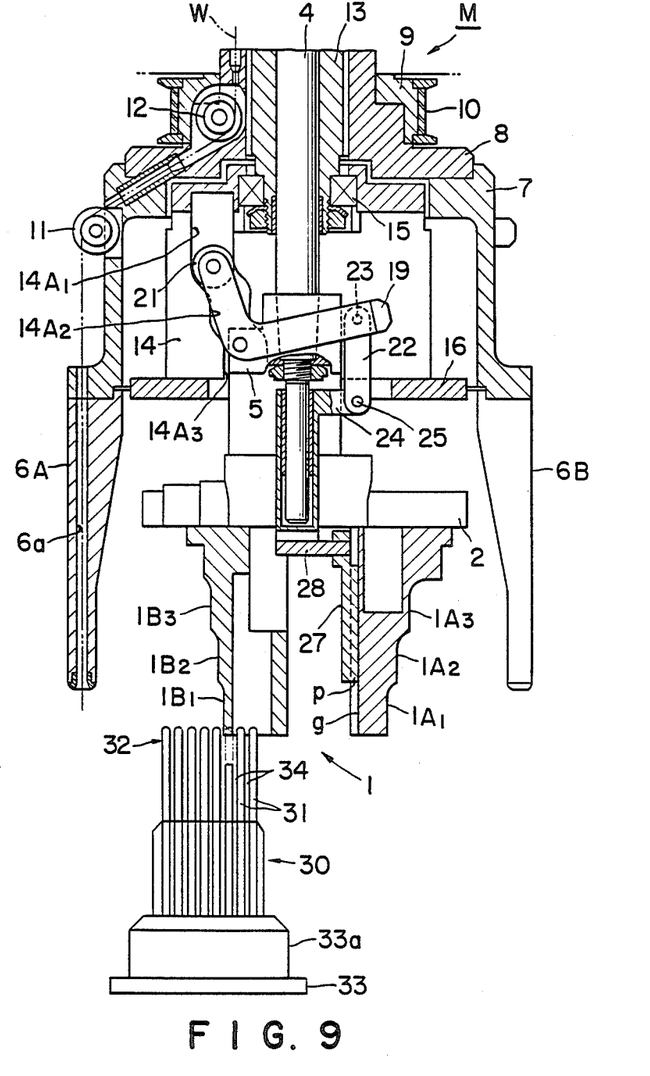
FIGS. 9 to 12 are views to explain the mode of operation of the apparatus for winding coils in FIG. 1, respectively.
Figure 10:
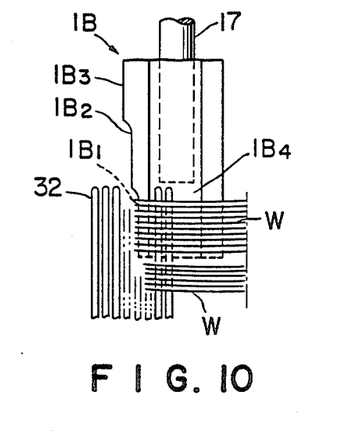

First, the driving shaft 4 is lowered so as to insert the blades 31 of the coil-inserting tool 30 by a short length into the opening $1B_4$ of the fixed coil former member 1B so that the lowermost(smallest) steps $1A_1$, $1B_1$ of the coil former members 1A, 1B are moved to a winding position, respectively, as shown in FIG. 9. At this time, the cam followers 21, 21 are slid down along the first cam profile $14A_1$ without swinging the actuating lever 19 from the state shown in FIG. 8 to the state shown in FIG. 6(a), and the guide plate 27 is lowered together with the movable coil former member 1A without protruding downward from the border between the first and second steps $1A_1$, $1A_2$ as shown in FIG. 7(a). In this state, the rotating member 8 with the pulley 9 is rotated by a timing belt 10, whereby the winding flyer 6A is rotated so as to wind a wire W on the lowermost steps $1A_1$, $1B_1$ of the coil former members 1A, 1B. During the rotation of the flyer 6A, a plurality of turns or windings of the wire W on the steps $1A_1$, $1B_1$ are dropped downward one by one along the outer surfaces $1A_{1t}$, $1B_{1t}$ tapered slightly inwardly of the coil former members 1A, 1B. When a predetermined number of turns for the first winding step operation on the lowermost steps $1A_1$, $1B_1$ of the coil former members 1A, 1B is almost completed, most part of the first winding step turns are inserted into the coil-inserting tool 30 with part of the turns left on the first winding steps $1A_1$, $1B_1$. Thereafter, the coil former 1 is further moved downward by the length of the first winding steps $1A_1$, $1B_1$ of the coil former members 1A, 1B by lowering the driving shaft 4 while the winding flyer 6A is rotated at a constant high speed as shown in FIG. 10. Thus, the second steps $1A_2$, $1B_2$ of the coil former members 1A, 1B are moved to a winding position, and a winding operation for the second-step turns of the wire is ready to start. At this time, the connecting member 5 is moved together with the driving shaft 4 and the cam followers 21, 21 are engaged with the second cam profiles $14A_2$ as shown in FIG. 6(b). Accordingly, the actuating lever 19 swings clockwise as shown in FIG. 6(b) to push the guide plate 27 downward through the link 22, the actuating link 24 and the connecting piece 28.

Figure 11:
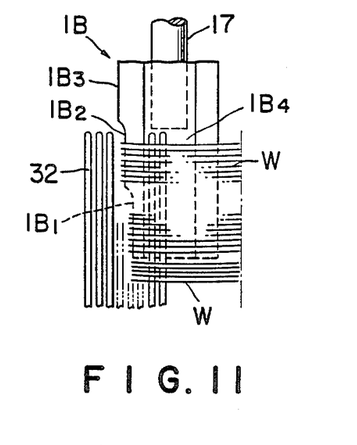
Figure 12:
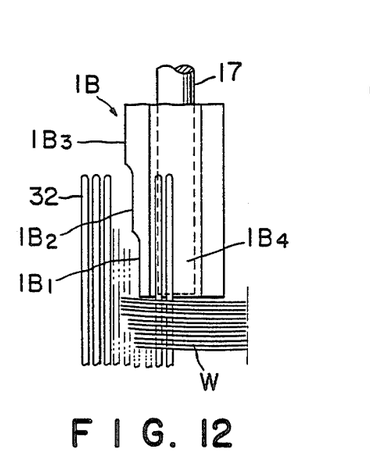
Figure 13:
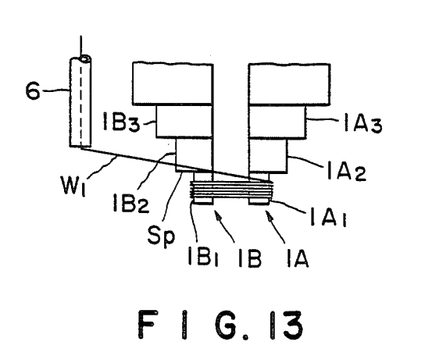
FIG. 13 is a side view of a conventional coil former to explain an advantageous effect of this invention.

In this manner, when the first step winding operation is transferred to the second winding operation, the guide plate 27 is moved downward at a higher speed than the coil former members 1A, 1B and by a larger distance (stroke) than the same to cause a relative movement between the guide plate 27 and the coil former member 1A. Accordingly, the skirt portions S, S of the guide plates 27 are projected downward from the border between the first and second winding steps $1A_1$, $1A_2$ with some turns of wires wound on the first step $1A_1$ received in the lower recesses $R_2$ as shown in FIG. 7(b). The recesses $R_2$ is for preventing the lower end of the guide plate 27 from pushing down the upper turns already wound on the first step $1A_1$. If the guide plate 27 pushes down the upper turns of the first step $1A_1$ when the first winding step operation is transferred to the second winding step operation, a leading portion of the wire cannot be smoothly led to the second winding step $1A_2$. In this case, as the leading portion Wo of the wire W drawn from the uppermost turns on the first winding step $1A_1$ is engaged with the lower guide step 27a of the guide plate 27, the leading portion Wo is surely led to the second step $1A_2$. The leading wire Wo slides upward along the tapered portion $27a_1$. Thereafter, a second winding operation on the second winding step $1A_2$ is carried out in such a manner that wire turns thereon are gradually pushed down to the coil-inserting tool. After a predetermined number of wire turns are wound on the second steps $1A_2$, $1B_2$ of the coil former members 1A, 1B, the coil former 1 is moved downward by a length of the step of the coil former member 1 by the driving shaft 4. When the third steps $1A_3$, $1B_3$ of the coil former members 1A, 1B are moved to a winding position as shown in FIG. 11, a third step winding operation is ready to start. At this time, the cam followers 21, 21 are engaged with the third cam profiles $14A_3$ as shown in FIG. 6(c). Then the actuating lever 19 further swings clockwise as shown in FIG. 6(c) to push down the guide plate 27 to a position lower than that of FIG. 6(b) with respect to the coil former member 1A so that the shoulder portions H, H of the guide plate 27 is placed in a position where the shoulder portions H, H cover the border of the second and third steps $1A_2$ and $1A_3$ as shown in FIG. 7(c). A leading portion Wo from the uppermost turns is engaged with the second guide step 27b to be smoothly led toward the third winding step $1A_3$ along the inclined surface 27b. In this manner, if the guide steps 27a, 27b guide each leading wire from the lower winding step to the next upper winding step when a winding operation is transferred to another winding operation, a smooth leading of the wire can be ensured. In a conventional apparatus, as such guide plate 27 was not provided, a leading wire W1 was apt to be caught by the step portion Sp or slip at the portion Sp as shown in FIG. 13. In the same manner, a predetermined number of turns are wound on the third steps $1A_3$, $1B_3$ of the coil former members 1A, 1B. In this manner, when a winding operation for the third-step has been finished, the spline shaft 13 is lowered by the expansion of the air cylinder for a relatively long distance to its lowermost position. Thus, the stripper rods 17 and stripper plates 18 are moved downward through the gaps $1A_5$, $1B_5$ to their lowermost positions, and consequently parts of coils left on the respective steps $1A_1$, $1B_1$; $1A_2$, $1B_2$; $1A_3$, $1B_3$ of the coil former members 1A, 1B are inserted entirely into the coil-inserting tool 30 as shown in FIG. 12. After a winding operation for a first pole of a stator of a motor is completed in the above manner, the leading end of the wire W of the first pole is clamped by a clamping assembly (not shown)

and the coil-inserting tool 30 is rotated at a predetermined angle in response to the number of poles to receive turns of wire for the next pole of the stator. Then, the next turns of wire are formed in the above manner. The above steps are repeated to obtain the desired number of turns of wire for each pole. After a predetermined number of coil groups are formed from the continous strand of wire, the cutting device (not shown) is actuated to cut the wire W. Thus, winding coils for a strator of an electric motor can be obtained.

A modification of the first preferred embodiment described above with reference to FIGS. 1~7 will be explained.

In the embodiment described above the driving mechanism combining a cam and a lever is used for causing the guide plate 27 to start going down synchronously with the coil former 1. But the driving mechanism is not limited to this and may be replaced by a known driving mechanism, such as an over-drive mechanism using a gear ratio of a rack and a pinion or using a leverage of a lever and a drive pin. The mechanism may be positioned in the coil former 1 if a space permits.

Further, in the above embodiment, the coil former members 1A, 1B have three steps. However, this invention can be adopted for coil former members having more than three steps.

As described above, according to the present invention, since the guide plate 27 projects downward from the coil former member moving downward so that each guide step of the guide plate is projected from each border between the adjacent steps of the coil former member, when a winding operation is transferred from a lower step of the coil former member to an upper step of the coil former member, the leading wire at the border between the adjacent steps of the coil former member. As a result, there is no need to decrease the rotative speed of the winding flyer when the winding operation is transferred whereby the efficiency of winding operation is improved remarkably.

Figure 7:
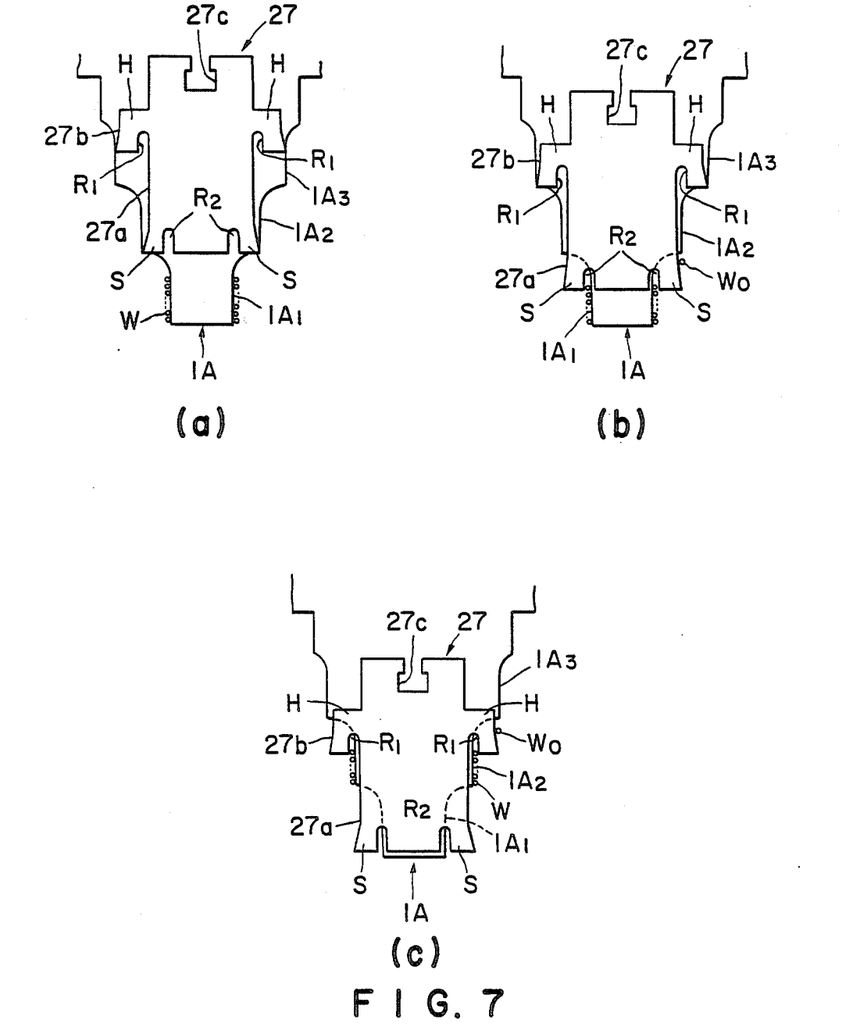

Further, in the above embodiment, a winding operation is transferred from a lowermost (first) step to a next upper (second) step. However, a winding operation may be transferred from the lowermost (first) step to the uppermost (third) step without a winding operation on a second winding step. In this case, a pair of recesses corresponding to the recesses $R_2$, $R_2$ of FIG. 7 must have a large depth for preventing the uppermost coil turn on the lowermost step from being pushed down by the lower end of a guide plate.

What is claimed is

1. A method of winding coils for an electric motor in which a coil former having a plurality of winding steps with increasingly larger size moves downward step by step, a wire fed from a winding flyer rotated around the coil former is wound on each step of the coil former and coils formed on each step of the coil former are inserted into a coil-inserting tool having a plurality of blades in a circle and disposed below the coil former, said method comprising the steps of:
   (a) moving downward the coil former in order to set a lower winding step of the coil former at a winding position;
   (b) winding a predetermined number of turns on the lower winding step of the coil former while rotating the winding flyer around the coil former, some turns being dropped into the coil-inserting tool;
   (c) moving downward the coil former in order to set an upper winding step of the coil former on which a winding operation is to be carried out at a winding position with at least one step located lower than the upper winding step, inserted into the coil-inserting tool, simultaneously moving downward a guide member having guide steps each corresponding to each step of the coil former at a higher speed than the coil former and by a larger distance than the same thereby to locate a step of the guide member in a position where the guide step is projected downward from the border between the upper winding step and a step adjoining downwardly of the upper winding step when a winding operation is transferred from the lower winding step of the coil former to the upper step thereof;
   (d) winding a predetermined number of turns on the upper winding step of the coil former while rotating the winding flyer around the coil former, some turns being dropped into the coil-inserting tool;
   (e) repeating the motions of the coil former, the guide member and the flyer in the same manner as the above two steps (c), (d) in response to the number of winding steps of the coil former; and
   (f) inserting all turns on each step of the coil former into the coil-inserting tool by moving down stripper means disposed so as to be moved vertically in the coil former.

2. A method of winding coils according to claim 1, wherein the guide member is disposed along the inside of the coil former, the relative movement between the guide member and the coil former being carried out by a cam and link mechanism operated in response to the vertical movement of a driving shaft.

3. A method of winding coils according to claim 1, wherein each guide step of the guide member is inclined in such a manner that two guide steps opposite to each other are expanded downward in order to lead a leading wire upward along the inclined steps.

4. An apparatus for winding coils for an electric motor in which a coil former having a plurality of winding steps with increasingly larger size moves downward step by step, a wire fed from a winding flyer rotated around the coil former is wound on each winding step of the coil former, and the coils formed on each step are inserted into a coil-inserting tool having a plurality of blades in a circle and disposed below the coil former, said apparatus comprising:
   (a) driving means for moving downward the coil former in the vertical direction step by step;
   (b) a guide member disposed in the coil former and having a plurality of guide steps for guiding a leading wire from a lower winding step to an upper winding step when a winding operation is transferred from the lower winding step to the upper winding step, one of the guide steps being so formed as to be projected from a corresponding border between the upper winding step and a step adjoining downwardly of the upper winding step; and
   (c) actuating means for moving downward the guide member at a higher speed than the coil former and by a larger distance than the same when a winding operation is transferred from a step of the coil former to an upper step of the coil former in order to project one of the guiding steps outward from the corresponding border between the upper winding step and a step adjoining downwardly thereof.

5. An apparatus according to claim 4, wherein said guide member is disposed slidably along the inner surface of a movable coil former member opposite to a fixed coil former member.

6. An apparatus according to claim 4, wherein said guide member is a plate in the form of a front view of a half-sleeve shirt having upper shoulder portions and a lower end and has an upper guide step as said shoulder portion and a lower guide step at said lower end, each guide step having two surfaces tapered in a manner expanding downward.

7. An apparatus according to claim 6 wherein said guide member has at least a pair of recesses near a corresponding guide step in registration with a corresponding winding step of the coil former for receiving some turns of wire wound on the corresponding winding step when the guide member is actuated.

8. An apparatus according to claim 4, wherein said actuating means comprises cam profile disposed along the driving means and a cam follower connected to the driving means through a link mechanism and engaged with the cam profile, the link mechanism being connected to the guide member.

* * * * *